United States Patent [19]

Johnson

[11] 4,037,072

[45] July 19, 1977

[54] APPARATUS FOR FABRICATING RESISTORS

[75] Inventor: Paul W. Johnson, Decatur, Ind.

[73] Assignee: E-Systems, Inc., Dallas, Tex.

[21] Appl. No.: 643,477

[22] Filed: Dec. 22, 1975

[51] Int. Cl.[2] ......................... B23K 11/10; B23B 5/00; H01C 17/04

[52] U.S. Cl. ......................................... 219/56; 29/618; 72/142; 228/4.5; 228/904; 279/106

[58] Field of Search ............... 29/202.5, 203, 205 CM, 29/610, 618, 619, 621; 72/142; 140/71.5; 228/4.5, 904; 219/78, 79, 56, 103; 279/106, 107, 108, 109, 110, 5, 117

[56] References Cited

U.S. PATENT DOCUMENTS

| | | | |
|---|---|---|---|
| 2,589,503 | 3/1952 | McCullough | 29/610 |
| 3,281,916 | 11/1966 | Goldsmith | 29/203 R X |
| 3,303,315 | 2/1967 | Smith et al. | 219/79 |
| 3,368,055 | 2/1968 | Seaman et al. | 219/103 X |

FOREIGN PATENT DOCUMENTS

| | | | |
|---|---|---|---|
| 837,376 | 6/1960 | United Kingdom | 279/117 |

*Primary Examiner*—Bruce A. Reynolds
*Assistant Examiner*—N. D. Herkamp
*Attorney, Agent, or Firm*—Robert V. Wilder

[57] ABSTRACT

Small electrical resistors, such as are used in circuits of comparatively low power, are automatically fabricated on a winding machine including a chuck assembly for facilitating the start and finish of a winding operation. The chuck assembly consists of a first jaw rotatably mounted with respect to a second jaw from a wire receiving position to a wire gripping position. The chuck is closed to grip a resistance wire at the start of a winding operation and an automatic welder operates to weld the wire to a metallic terminal cap positioned at one end of a resistor core. Upon completion of the welding operation, the jaws of the chuck assembly are opened and a winding head operates to rotate the resistor core to begin a winding operation. The winding operation continues for a preset number of turns at which time the jaws of the chuck assembly are moved to a closed position to clamp the resistance wire. The welder is again actuated to attach the resistance wire to a second terminal cap to complete the resistor construction. A wire cutter is actuated to sever the welded end of the resistance wire from the wire held in the jaws of the chuck assembly. The operation is repeated to wind another resistor.

17 Claims, 7 Drawing Figures

APPARATUS FOR FABRICATING RESISTORS

This invention relates to apparatus for fabricating wire wound resistors, and more particularly to apparatus for winding precision wire wound resistors by an automatic sequence.

Wire wound resistors are usually of a precision construction with rather close limits of resistance tolerance maintained. Generally, precision resistors are constructed by winding a resistance wire on a rotating ceramic core. The ends of the wire element are welded or otherwise electrically and mechanically connected to terminal caps encircling the core at opposite ends thereof. Extending from the terminal caps are conventional, relatively heavy gauged, lead wires. Certain difficulties are encountered in the manufacturing of resistors of this type. The precision requirements of the resistor require careful quality control and repeatability during the manufacturing process.

Heretofore, the winding of precision resistors required many manual operations to insure the quality and precision of the finished product. Consequently, the production of precision resistors was slow and very expensive. Furthermore, the rejection rate was relatively high due to the many manual operations required in the winding procedure.

In accordance with the present invention, many of the manual steps heretofore performed in the manufacture of precision resistors have been replaced by automatic operations that enable an accurate repetitive sequence. A resistance wire is clamped into a chuck assembly between jaws and rotated 180° around an insulating core that has been previously provided with terminal caps on opposite ends. Upon completion of the 180° rotation of the chuck assembly, opposed welding electrodes automatically close and are energized to weld the clamped resistance wire to one of the terminal caps of the core. When the welding sequence has been completed the welding electrodes are retracted and a power operated shear is activated to cut the wire between the weld and the chuck assembly. A winding head rotates the core thereby winding the resistance wire around the core to form a resistor of an established value. During the winding operation the chuck assembly moves with the wire feeding apparatus to the opposite end of the core and the jaws of the chuck are opened. With the completion of the winding operation, the jaws are again closed to clamp the wire while the welding electrodes are again actuated to secure the wire to the second terminal cap. When the weld is completed, another automatic shear is operated to sever the wire between the chuck assembly and the terminal cap.

Apparatus in accordance with the present invention for fabricating a wire wound resistor on a rotating core includes a chuck assembly having a first jaw and a second jaw movable with respect to each other. The jaws are movable from an open position for receiving a wire to a closed wire gripping position by means of a rotating mechanism coupled to the chuck assembly. In accordance with a specific embodiment of the invention, the chuck includes a first support member to which is mounted the first jaw and a second support rotatable with respect to the first support with the second jaw mounted to the second support. The mechanism for rotating the chuck consists of means for rotating the supports relative to each other.

A more complete understanding of the invention and its advantages will be had by reference to the following description taken in conjunction with the accompanying drawings.

Referring to the drawings.

Figure 1:
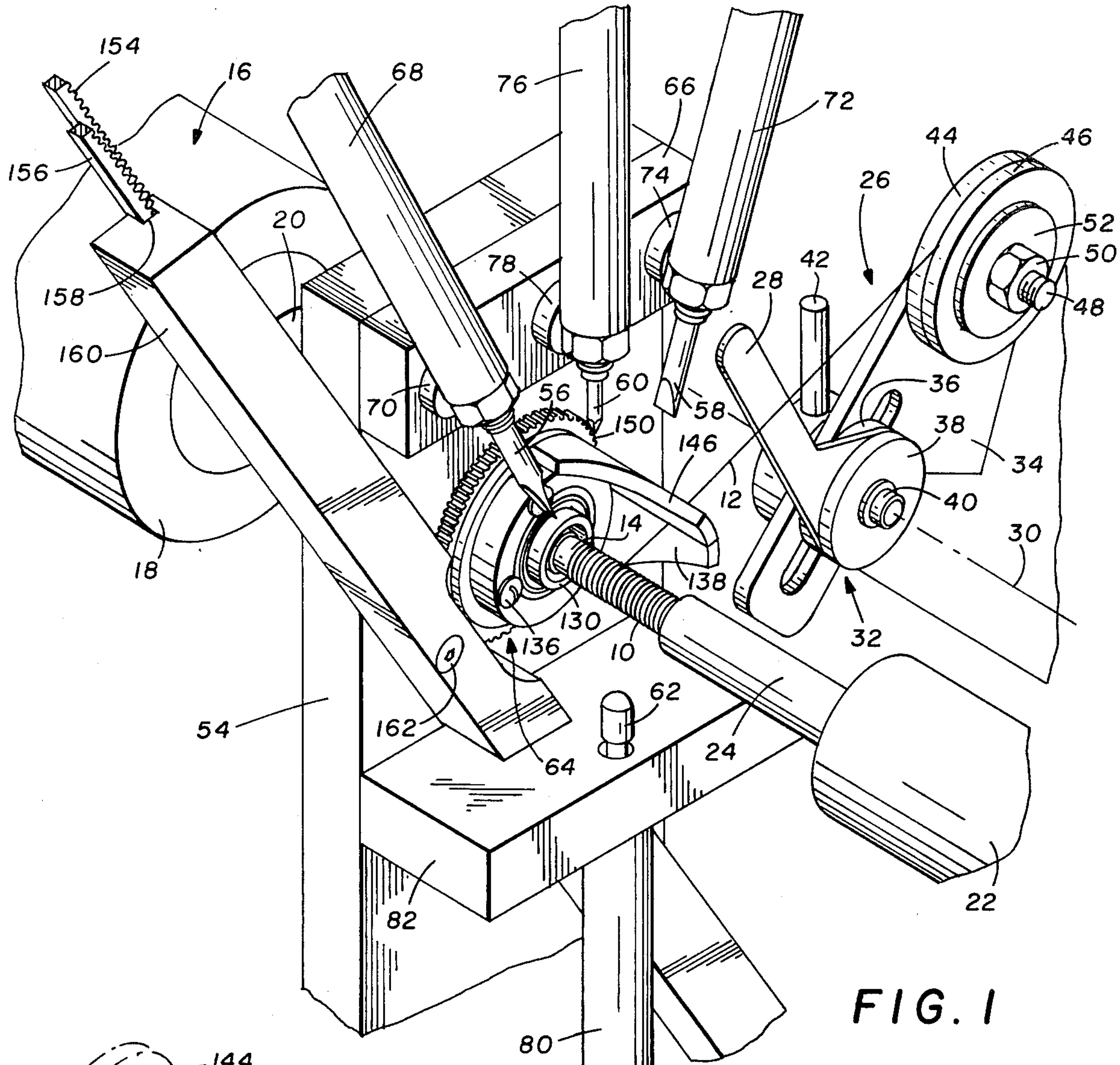
FIG. 1 is a pictorial of winding apparatus for the manufacture of precision wire wound resistors.

Referring to FIG. 1, there is shown a pictorial of a resistor wrapping winding machine where a wire wound resistor is formed on an electrically insulating core 10 such as a ceramic or other nonconductive material capable of operating in a high temperature environment. The resistor is formed by apparatus that deposits a continuous layer of resistance wire 12 on the core 10 between two terminal caps, such as the terminal cap 14. The core 10 may or may not be formed with grooves to position each turn of the resistance wire 12 as the core is rotated in the winding machine of FIG. 1.

To rotate the core 10 to lay the turns of resistance wire 12, the terminal cap 14 that encloses one end of the core is secured to a winding head 16 that includes in addition to a conventional power source and speed controls a drum 18 having a driving chuck 20 that extends to support the core 10 for rotation during a winding process. The end of the core 10 opposite the driving chuck 20 is supported in a deadhead 22 that includes an extendible rotatable chuck 24. The deadhead 22 and rotatable chuck 24 are of a conventional design and provide no part of the present invention. Similarly, the winding head 16 may be of a conventional configuration and further description of the winding head and deadhead will merely burden the description of the invention.

To guide the resistance wire 12 in layers on the core 10, a wire guide assembly 26 is positioned with respect to the core and includes a guide bar 28 that moves along an axis 30 generally parallel to the longitudinal axis of the core 10. The guide bar 28 moves with respect to the longitudinal axis of the core 10 at a rate dependent upon the speed of rotation of the core as determined by the power source of the winding head 16. Thus, there is a direct relationship between the lateral movement of the guide bar 28 and the speed of rotation of the core 10.

The guide bar 28 is part of a feeding mechanism 32 that includes the guide bar coupled to the support plate 34 between tension washers 36 and 38. These washers are positioned on a shaft 40 extending through a slotted opening of the support plate 34 and attached to a guide bar handle 42. The handle 42 provides a means for an operator to adjust the position of the wire guide 28 with respect to the core 10 for proper feeding at the resistance wire 12.

Also mounted to the support plate 34 is a shaft 48 on which is rotatably mounted felt washers 44 and 46. The shaft 48 is externally threaded to receive a tension nut 50 with a washer 52 assembled between the tension nut and the felt washer 46. The resistance wire 12 passes from a wire supply spool (not shown) between the felt washers 44 and 46 and by properly adjusting the tension nut 50, the correct tension is provided for the resistance wire 12 to produce a smooth and continuous flow of the wire on the core 10.

To automatically wind the resistance wire 12 on the core 10, the automatic fixture of the present invention includes a carriage 54 slidably mounted to be movable in the direction of the longitudinal axis of the core 10 and supporting a start cutter 56 and a finish cutter 58 along with welding electrodes 60 and 62. Further, the carriage 54 supports a chuck assembly 64 for gripping the resistance wire 12 during the start and finish operations of the winding procedure. Both the start cutter 56 and the finish cutter 58, along with the electrode 60, are mounted to the carriage 54 by means of a spacer block 66. Specifically, the start cutter 56 is position controlled by means of an actuator 68 welded or otherwise attached to a support tab 70 having a threaded shaft extending through the spacer block 66 into the carriage 54. Similarly, the finish cutter 58 is position controlled by means of an actuator 72 welded or otherwise fastened to a support tab 74 that also includes a threaded shaft extending through the spacer block 66 into the carriage 54. The electrode 60 is position controlled by means of an actuator 76 that is welded or otherwise attached to a support tab 78 attached to the carriage 54. Opposite the core 10 and in alignment with the electrode 60 is the electrode 62 that is position controlled by means of an actuator 80 secured to an insulating mounting block 82. The block 82 is fastened to the carriage 54 in a perpendicular arrangement.

With reference to each of the actuators 68, 72, 76, and 80, a line drawn through a longitudinal axis of each and extending therefrom will pass through the longitudinal center line of the core 10. Thus, when each of the cutters 56 or 58 and the electrodes 60 and 62 are controlled to an extended position they move in contact with the core 10.

Figure 2:
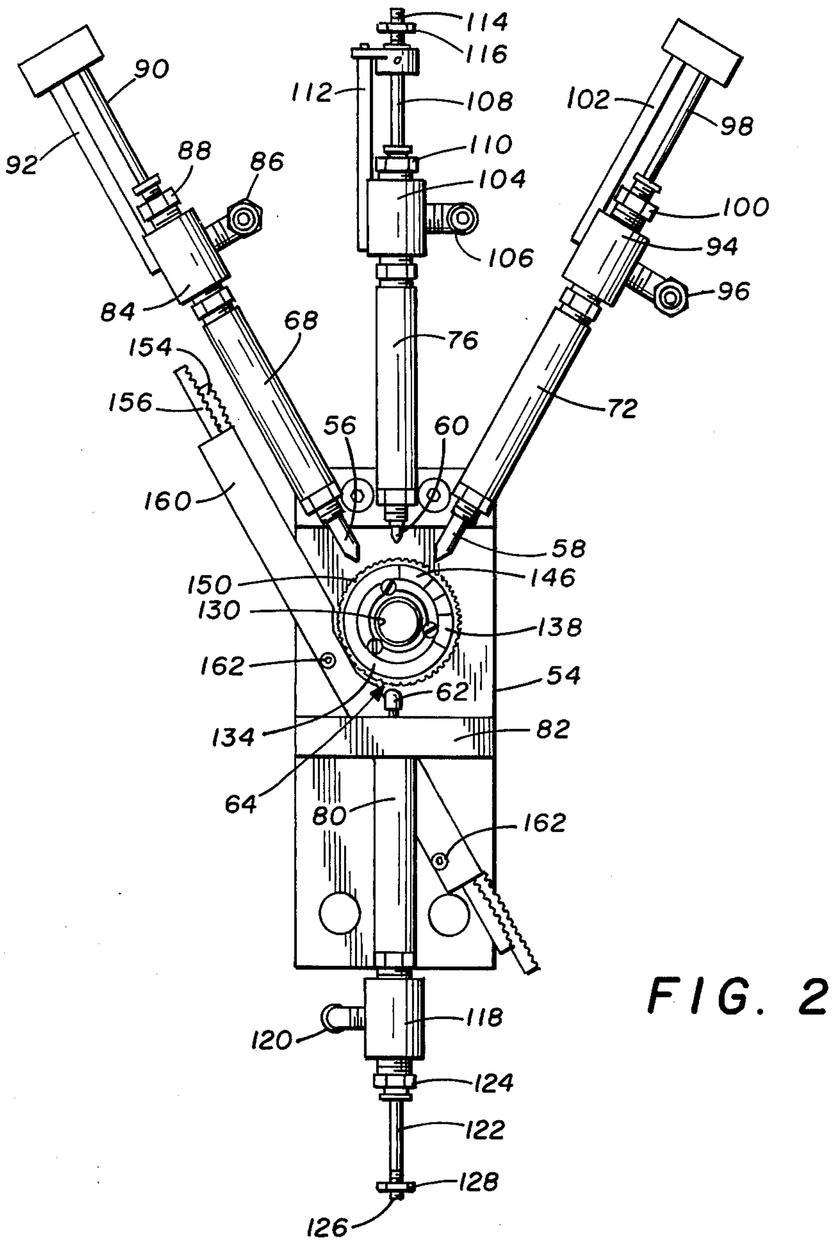
FIG. 2 is a plan view of a chuck assembly in accordance with the present invention including power actuated shears and welding electrodes.

Referring to FIG. 2, there is shown a complete assembly of each of the actuators 68, 72, 76 and 80. As illustrated, each is a fluid actuator whereby air pressure applied to a cylinder controls the position of an internal piston connected to either the cutters 56 or 58 or the electrodes 60 or 62.

Referring specifically to the actuator 68, it comprises a cylinder capped with a supply manifold 84 into which is threaded a fitting 86 connected to an air supply through appropriate controls, as will be explained. Extending through a packing 88 is a piston rod 90 terminating in a cutter guide assembly including an orientation bar 92. The orientation bar 92 slides in a groove formed in the supply manifold 84 to orient the start cutter 56 such that the knife edge extends parallel with the longitudinal axis of the core 10. The actuator 72 is similar to the actuator 68 and includes a supply manifold 94 with fitting 96 threaded into an opening of the manifold. A piston rod 98 extends through a packing 100 of the manifold 94 and terminates in a cutter guide assembly including an orientation bar 102. The orientation bar 102 slides in a groove of the manifold 94 and orients the finish cutter 58.

Referring next to the actuator 76, it also includes a supply manifold 104 with a fitting 106 threaded into an opening of the manifold and a piston rod 108 extending from a packing 110. Attached to the piston rod 108 is a guide assembly including an orientation bar 112 that slides in a groove of the manifold 104 to orient the electrode 60 such that the edge is parallel with the longitudinal axis of the core 10. The outer end of the piston rod 108 is threaded at a section 114 and includes a terminal 116 for connecting the electrode 60 to a power source (not shown) to be described.

The acutator 80 also includes a supply manifold 118 having a fitting 120 threaded into an opening thereof and including a piston rod 122 extending through a packing 124. The end of the piston rod 122 includes a threaded section 126 having a terminal 128 for completing a connection of the electrode 62 to a power source.

Figure 3:
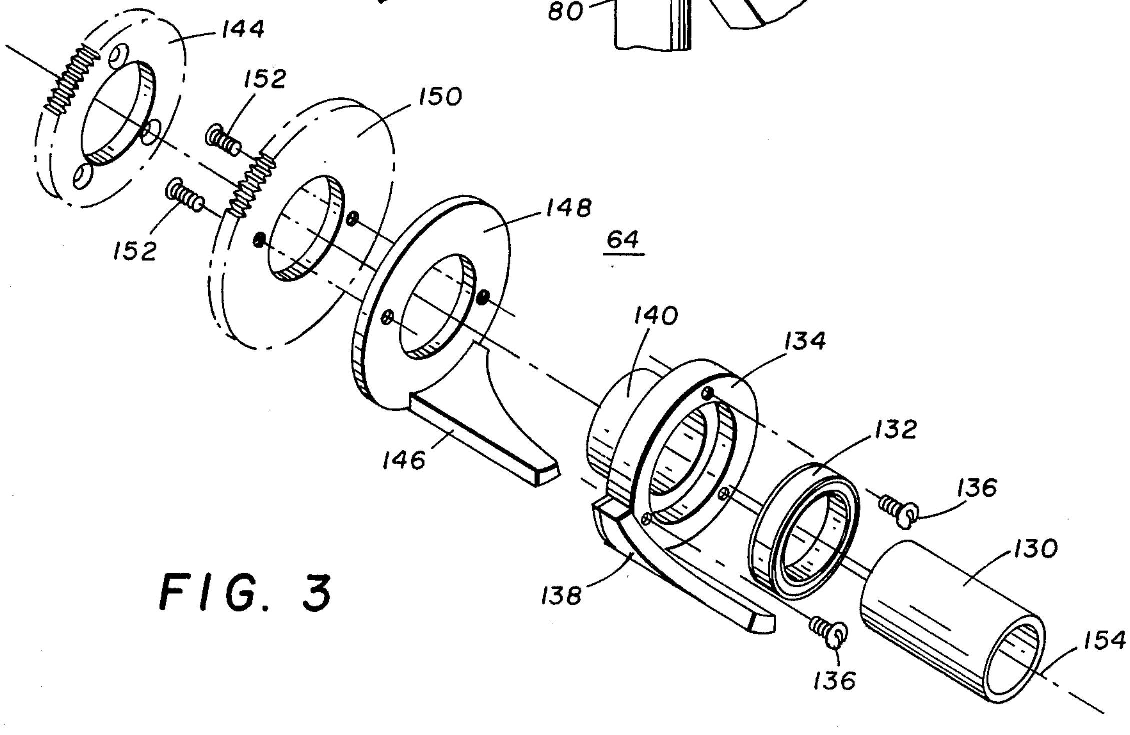
FIG. 3 is an exploded view of the chuck assembly of FIG. 2.

Referring to FIGS. 1–3, also supported on the carriage 54 is the chuck assembly 64 including a bushing 130 press fit into an opening of the carriage and supporting a bearing 132. The bearing 132 is pressed into an opening of a collar 134 and is secured in place by means of machine screws 136. Attached to the outer circumference of the collar 134 is a left jaw member 138 that rotates with the collar 134 as will be explained. Extending from the back side of the collar 134 is a hollow shaft 140 that is pressed into an opening 142 of a left member drive gear 144. A right jaw member 146 is attached to a drive plate 148 that is positioned against a right member drive gear 150 and secured thereto by means of machine screws 152.

Figure 5:
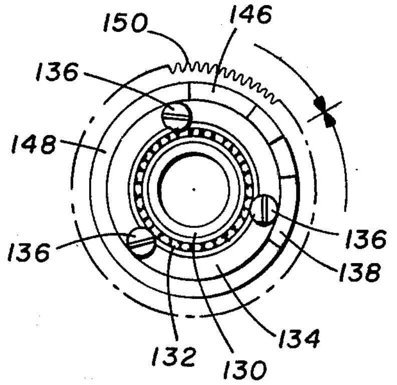
FIG. 5 is a front view of the chuck assembly with the jaws closed in a wire gripping position.

As best illustrated in FIG. 1, when the parts of the exploded view of FIG. 3 are assembled, the jaw members 138 and 146 are juxtapositioned and are movable from a wire gripping position as shown in FIG. 1 and FIG. 5, to a wire winding position, as will be explained. The drive gear 144 does not appear in the views of FIGS. 1 and 3 as it extends into a recess of the carriage 54. When assembled to the carriage 54, the longitudinal axis 154 of the chuck assembly 64 coincides with the longitudinal axis of the core 10 when positioned for a winding operation.

With reference to FIGS. 1 and 2, to position the jaws 138 and 146 with respect to each other, drive racks 154 and 156 mesh with the drive gears 144 and 150, respectively. The drive rack 154 slides in a slot formed in the carriage 54 and the drive rack 156 slides in the groove 158 of a retaining bar 160. The bar 160 is fastened to the carriage 54 by means of bolts 162 and also maintains the drive rack 154 in place to engage the drive gear 144.

By imparting a longitudinal movement to the drive racks 154 and 156, the printing relationship between the jaws 138 and 146 is controlled. Further, by controlled movement of the racks 154 and 156, the position of the jaws 138 and 146 with respect to the wire guide 28 is also controlled.

Figure 4:
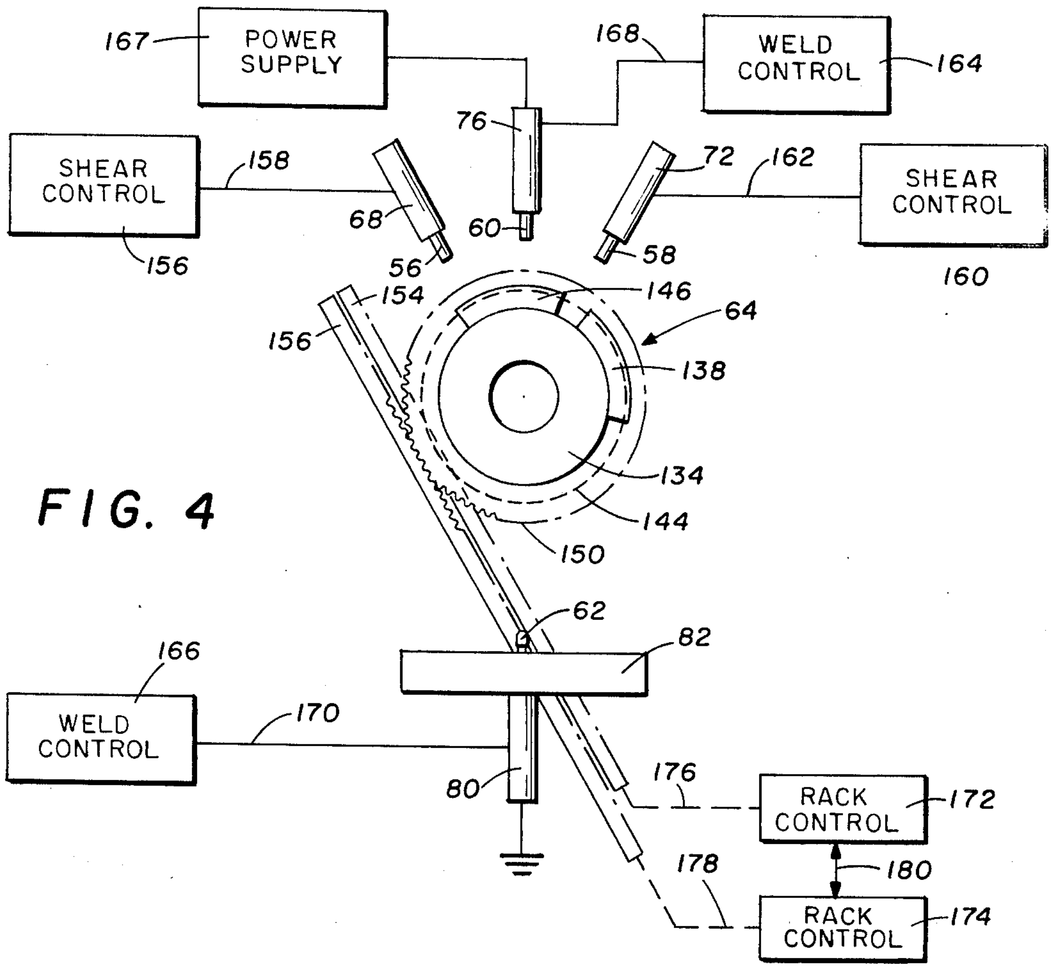
FIG. 4 is a schematic of a control system for the chuck assembly and actuators of the apparatus for FIG. 2.

Referring to FIG. 4, there is shown a block diagram of controls for the actuators 68, 72, 76 and 80 and the chuck assembly 64. A shear control 156 is connected to the actuator 68 by means of a pipe 158. The shear control 156 may comprise a control valve connected between a source of air pressure and the line 158. Opening the valve of the shear control 156 connects the actuator 68 to the source of air pressure driving the start cutter 56 downward toward the core 10 into a shearing position. The sequence of operation of the actuator 68 in the winding operation will be explained.

Similarly, a shear control 160 is connected to the actuator 72 by means of a pipe 162 and controls the application of air pressure to the actuator. Connecting air pressure to the actuator 72 drives the finish cutter 58 downward toward the core 10 into a shearing position.

When the respective shear controls 156 and 160 disconnect the source of air pressure from the actuator, the cutters 56 and 58 are withdrawn to the retracted position as illustrated in the drawings. In one embodiment of the present invention, the cutters 56 and 58 were withdrawn to the position shown by spring biasing in the actuators 68 and 72, respectively. Double acting actuators may also be utilized.

Position control for the electrodes 60 and 62 is achieved by weld controllers 164 and 166, respectively. The weld controller 164 is connected to the actuator 76 for the electrode 60 by means of a line 168 and the weld controller 166 is connected to the actuator 80 by means of a line 170. Again, the weld controllers 164 and 166 may include control valves between a source of air pressure and the lines 168 and 170, respectively. During the welding sequence, the electrodes 60 and 62 are simultaneously extended in contact with the terminal caps of the core 10 by application of air pressure to the actuators 76 and 80 by means of the respective weld controllers 164 and 166. The electrodes 60 and 62 are spring biased to return to the extended position as shown in the Figures.

To control the relative position of each of the jaws 138 and 146 with respect to each other and with respect to the guide bar 28, rack controllers 172 and 174 are mechanically connected to the racks 154 and 156, respectively. The rack controller 172 is connected to the rack 154 by means of a mechanical linkage 176 and the rack controller 174 is connected to the rack 156 by means of a mechanical linkage 178. The rack controllers 172 and 174 may comprise an electromechanical transducer that provides a linear displacement to the mechanical linkages 176 and 178 and in turn to the racks 154 and 156. The rack controllers 172 and 174 are interconnected by means of a line 180 to provide synchronous control to enable movement of both racks 154 and 156 simultaneously over the same distance.

Figure 6:
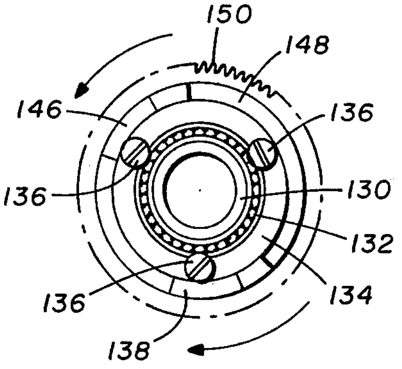
FIG. 6 is a front view of the chuck assembly with the rotatable jaws in a wire receiving position.
Figure 7:
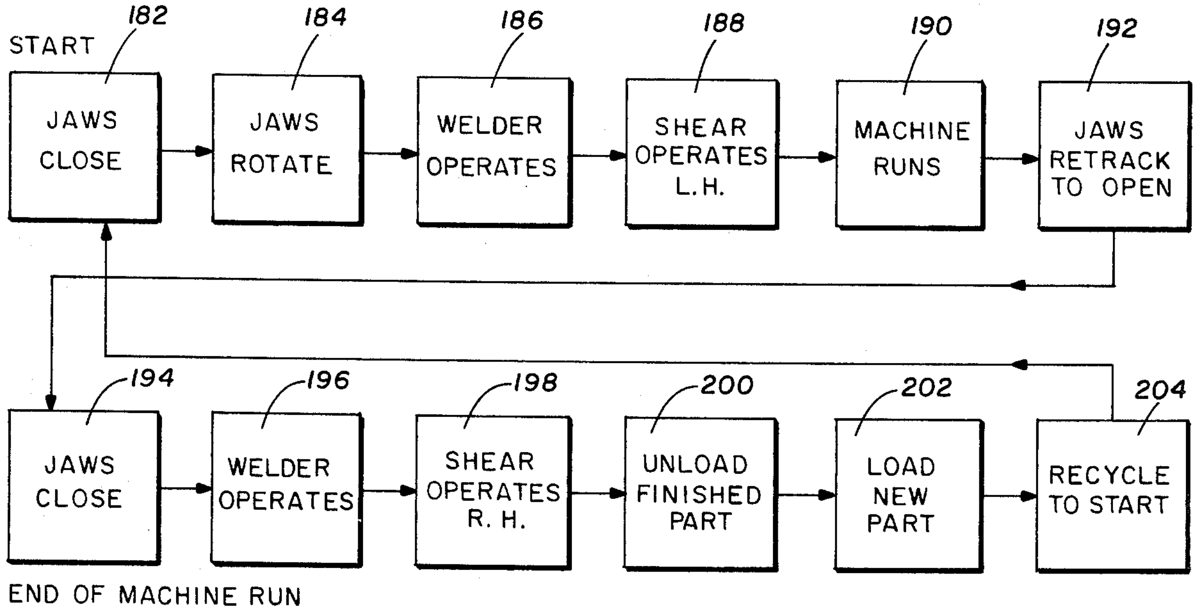
FIG. 7 is a flow chart of the process for manufacturing a wire wound resistor with the apparatus of the present invention.

Referring to FIGS. 5–7, the operation of the apparatus will now be explained. To begin the process of winding a resistor on the core 10, the rack controllers 172 and 174 are activated to close the jaws 138 and 146 to grip the resistance wire 12 as shown in FIG. 1. Thus, the function of the jaws during a close step 182 is to grip the resistance wire 12 which will be wound on the core 10. With the wire gripped by the jaws 138 and 146, the process advances to a rotate step 184 where again the rack controllers 172 and 174 are actuated to rotate the chuck assembly 64 in a counterclockwise direction around the resistance core 10. The chuck assembly rotates to a position approximately 180° from that illustrated in FIG. 1 and in this position the resistance wire 12 is in contact with the terminal cap 14.

With the resistance wire 12 held in place in contact with the terminal cap 14 the process advances to a weld step 186 during which the power supply 167 is energized and the weld controllers 164 and 166 are actuated. The electrode 60 is driven downward in contact with the terminal cap 14 and the electrode 62 is driven upward also to contact the terminal cap. With the electrodes energized through the power supply 167, a standard spot welding operation is completed to secure the resistance wire 12 to the terminal cap 14. The power supply 167 is then deenergized and the controllers 164 and 166 deactivated to allow the electrodes 60 and 62 to be withdrawn into the position shown in FIG. 1.

Next the process advances to a shear step 188 and the shear controller 156 is activated to connect a source of air pressure to the actuator 68 and extend the cutter 56 to clip the resistance wire 12 beween the jaws and the terminal cap 14. The resistance wire 12 is now secured to the terminal cap 14 and the machine is ready to wind a resistor element on the core 10. The winding head 16 is activated in a machine run step 190 and the resistance wire 12 is laid onto the core 10. When the designated length of resistance wire 12 has been wound onto the core 10 the winding head 16 is shut down.

During the winding process, a retract step 192 is completed by actuating the rack controllers 172 and 174. At this time the controllers are actuated to open the jaws 138 and 146 into the position shown in FIG. 6.

During the winding operation, the carriage 54 is moved from the start position to the finish position in proximity to the rotatable chuck 24. The carriage 54 is moved laterally along the longitudinal axis of the core 10 and the chuck assembly 64 is rotated clockwise by actuating the rack controllers 172 and 174. The rack controllers 172 and 174 are individually energized in a close step 194 to grip the resistance wire 12 between the guide bar 28 and the core 10, as illustrated in FIG. 1.

Upon completion of the close step 194, which includes the rotation of the chuck assembly 64, a weld step 196 is completed. During the step 196, the power supply 167 is energized and the weld controllers 164 and 166 actuated to carry out the welding procedure as previously described with regard to the step 186. With the completion of the welding operation 196, the process advances to a shear operation 198 during which the shear controller 160 is activated and the actuator 72 drives the cutter 58 in the direction of the core 10 to clip the resistance wire 12 between the terminal cap and the jaws.

Upon completion of the step 198, the resistor is finished and the unloaded step 200 and the load step 202 are completed to prepare for the winding of another resistor. The sequence advances to the "recycle to start" step 204 during which the carriage 54 is returned to the start end of the core 10. The jaws maintain a grip on the resistance wire 12 such that the step 182 is bypassed on all subsequent cycles and the process immediately advances to the jaw rotate step 184.

With the apparatus of the present invention, manual operation to complete the winding of the resistor is minimized whereupon only the unloading and loading steps remain for an operator. The positioning of the resistance wire 12 for the welding operation at both the start and finish of the welding operation is automatically completed. Similarly, the shearing operation is completed without manual control.

While only one embodiment of the invention, together with modifications thereof, has been described in detail herein and shown in the accompanying drawings, it will be evident that various further modifications are possible without departing from the scope of the invention.

What is claimed is:

1. Apparatus for fabricating a wire wound resistor on a rotating core, comprising in combination:

a wire holding chuck including:

a first supporting member mounted transverse of and coaxial with the longitudinal axis of the rotating core, a first jaw supported on said first member and extending in a direction along the longitudinal axis of the rotating core, a second supporting member juxtapositioned the first member and mounted coaxial with the longitudinal axis of the rotating core, a second jaw supported on said second member and extending in a direction along the longitudinal axis of the rotating core, and means for rotating one of said supporting members relative to the other between an open position and a wire gripping position where said first and second jaws are in side-by-side contact.

2. Apparatus for fabricating a wire wound resistor as set forth in claim 1 wherein said second member is rotatable with respect to the first member.

3. Apparatus for fabricating a wire wound resistor as set forth in claim 2 wherein said second member includes a ring gear and said means for rotating includes a rack in engagement with the ring gear for rotation thereof relative to the first member.

4. Apparatus for fabricating a wire wound resistor as set forth in claim 1 wherein said first and second jaws extend the full length of said rotating core.

5. Apparatus for fabricating a wire wound resistor on a rotating core, comprising in combination:

a first supporting member mounted transverse of and coaxial with the longitudinal axis of the rotating core and positioned to rotate about said core, a second supporting member juxtapositioned the first member and mounted coaxial with the longitudinal axis of the rotating core and rotatable with respect to said first member, a first jaw supported on said first member and extending in the direction along the longitudinal axis of the rotating core, a second jaw mounted to said second member and extending in a direction along the longitudinal axis of the rotating core and rotatable with respect to the first jaw from an open position to a wire gripping position, and means for rotating the second of said supporting members relative to the first supporting member to rotate the second jaw relative to the first jaw between the open position and the wire gripping position.

6. Apparatus for fabricating a wire wound resistor as set forth in claim 5 including means to position said first jaw as mounted on the first member in the direction of the second jaw.

7. Apparatus for fabricating a wire wound resistor as set forth in claim 6 wherein said second member includes a ring gear and said means for rotating includes a rack in engagement with said ring gear to rotate the second member relative to the first member.

8. Apparatus for fabricating a wire wound resistor as set forth in claim 5 including welding means mounted on a carriage and including welding electrodes positionable with respect to the rotating core.

9. Apparatus for fabricating a wire wound resistor as set forth in claim 5 including shearing means mounted on the carriage and including a cutter positionable with respect to the rotating core.

10. Apparatus for fabricating a wire wound resistor on a rotating core, comprising in combination:

a carriage positioned to move along the longitudinal axis of the rotating core, a chuck mounted to said carriage and including:

a first supporting member mounted transverse of and coaxial with the longitudinal axis of the rotating core, a first jaw supported on said first member and extending in a direction along the longitudinal axis of the rotating core, a second supporting member juxtapositioned said first member and mounted coaxial with the longitudinal axis of the rotating core, a second jaw supported on said second member and extending in a direction along a longitudinal axis of the rotating core, means for rotating one of said members relative to the other between an open position and a wire gripping position where said first and second jaws are in side-by-side contact, welding means mounted to said carriage along an axis transverse of the longitudinal axis of the rotating core and including welding electrodes positionable transversely with respect to the rotating core, and shearing means mounted to said carriage along an axis transverse of the longitudinal axis of the rotating core and including cutters transversely positionable with respect to the core.

11. Apparatus for fabricating a wire wound resistor as set forth in claim 10 wherein said shearing means includes a first cutter for operation during the start of the fabricating of a resistor and a second cutter operable at the finish of a resistor fabrication.

12. Apparatus for fabricating a wire wound resistor as set forth in claim 11 wherein said first and second cutters each include an actuator for moving the respective cutter from a retracted position to an extended position.

13. Apparatus for fabricating a wire wound resistor as set forth in claim 10 wherein said welding means includes first and second electrodes in axial alignment and positioned transverse to the longitudinal axis of the rotating core.

14. Apparatus for fabricating a wire wound resistor as set forth in claim 13 wherein said welding means includes first and second actuators for the first and second welding electrodes, respectively, for positioning said electrodes from a retracted position to an extended welding position.

15. Apparatus for fabricating a wire wound resistor as set forth in claim 10 wherein said chuck includes a first member supporting the first jaw and a second member rotatable with respect to the first member, with a second jaw mounted to the second member, and said means for rotating includes means for rotating the second member relative to the first member.

16. Apparatus for fabricating a wire wound resistor as set forth in claim 15 wherein said second member includes a ring gear and said means for rotating includes a rack in engagement with the ring gear for rotation thereof relative to the first member.

17. Apparatus for fabricating a wire wound resistor as set forth in claim 16 wherein said first member includes a ring gear and said means for rotating includes a second rack in engagement with the ring gear of said first member for rotation thereof relative to the second member.

* * * * *